US006162347A

United States Patent [19]

Fleck

[11] Patent Number: 6,162,347

[45] Date of Patent: Dec. 19, 2000

[54] CO-MACHINED BONDED AIRFOIL

[75] Inventor: James N. Fleck, Boxford, Mass.

[73] Assignee: General Electric Company, Cincinnati, Ohio

[21] Appl. No.: 09/161,300

[22] Filed: Sep. 28, 1998

[51] Int. Cl.[7] .............................. B23H 5/00; B21D 53/78

[52] U.S. Cl. ...................................... 205/662; 29/889.721

[58] Field of Search .................................... 205/672, 662; 29/889.721

[56] References Cited

U.S. PATENT DOCUMENTS

| | | | |
|---|---|---|---|
| 3,656,222 | 4/1972 | Jones | 29/156.8 H |
| 4,364,160 | 12/1982 | Eiswerth et al. | 29/156.8 H |
| 4,417,381 | 11/1983 | Higginbotham | 29/156.8 H |
| 4,543,020 | 9/1985 | Shtipelman | 409/12 |
| 5,152,059 | 10/1992 | Midgley | 29/889.7 |
| 5,176,499 | 1/1993 | Dalmis et al. | 416/97 R |
| 5,230,183 | 7/1993 | Wagner, Jr. | 51/217 R |
| 5,429,877 | 7/1995 | Eylon | 428/586 |
| 5,653,925 | 8/1997 | Batchelder | 264/113 |
| 5,662,783 | 9/1997 | Cannon et al. | 204/224 M |
| 5,711,068 | 1/1998 | Salt | 29/889.1 |

FOREIGN PATENT DOCUMENTS

| | | |
|---|---|---|
| 2095589A | 10/1982 | United Kingdom . |
| 2656897 | 7/1991 | United Kingdom . |

*Primary Examiner*—Kathryn Gorgos
*Assistant Examiner*—Erica Smith-Hicks
*Attorney, Agent, or Firm*—Andrew C. Hess; Rodney M. Young

[57] ABSTRACT

A method of making a hollow airfoil includes machining first and second parts to produce internal features thereof. The parts are then co-machined simultaneously at complementary joining surfaces. The parts are then bonded together at the co-machined joining surfaces.

20 Claims, 5 Drawing Sheets

CO-MACHINED BONDED AIRFOIL

BACKGROUND OF THE INVENTION

The present invention relates generally to gas turbine engines, and, more specifically, to the manufacture of airfoils therein.

A turbofan aircraft engine is one form of a gas turbine engine which includes in serial flow communication a fan, multistage axial compressor, combustor, high pressure turbine (HPT), and low pressure turbine (LPT). During operation, air is channeled past the fan and a portion thereof enters the compressor for being pressurized and then mixed with fuel in the combustor and ignited for generating hot combustion gases. The combustion gases flow in turn through the HPT and LPT which extract energy therefrom for powering the compressor and fan, respectively.

The engine includes various airfoils in the form of rotor blades such as those found in the fan, compressor, and turbines. Additional airfoils are in the form of stator vanes also found in the compressor and turbines.

Since the turbine blades and vanes are subject to the hot combustion gases during operation, they are typically hollow for channeling therethrough a portion of air bled from the compressor for cooling. The high pressure turbine vanes and blades experience the most severe temperature environment and therefore require corresponding cooling thereof for obtaining a suitable useful life during operation.

Typical cooling features found in turbine blades include multi-pass serpentine cooling passages; turbulators in various forms in the cooling passages for enhancing cooling effectiveness; various holes through the airfoils for preferentially cooling the pressure and suction sides, leading and trailing edges, and tip both convectively or by generating cooling films; and impingement baffles inside the airfoils having impingement holes which direct a portion of the cooling air in impinging jets against the inner surface of the airfoils for enhancing internal cooling thereof.

Since these airfoils are initially internally cooled, the internal cooling features must be suitably formed therein. This is typically accomplished by casting the airfoils to near-net shape both internally and externally. Externally the airfoil may then be machined to final or finish configuration to meet the close tolerances required for maximizing engine performance. However, it is not possible to machine the internal cooling features of the airfoils, which may be formed only to the accuracy provided by the specific casting method.

Furthermore, the ability to use impingement baffles in turbine vanes and blades is limited by the ability to assemble the baffles therein since it is not practical to separately cast perforated baffles therein. The individual baffles are preformed and inserted into the airfoils from either of their two opposite ends as practical, and then fixedly bonded at one end thereof inside the airfoil for allowing unrestrained differential thermal expansion and contraction relative to the airfoil itself.

Gas turbine engine performance is primarily affected by the temperature of the combustion gases, with efficiency increasing as temperature increases subject to the high temperature strength of the materials being used and the available cooling thereof. Since the internal cooling features of typical turbine vanes and blades are limited in accuracy and detail by the particular casting methods utilized, further advances in engine efficiency may be obtained by further advances in the internal airfoil cooling features.

Turbine airfoils may also be manufactured in two parts so that the internal cooling features thereof may be preformed prior to assembly of the two parts. In view of the hostile environment of the gas turbine airfoils, the two parts must then be adequately joined together for maintaining the structural integrity thereof. This may be accomplished by the conventionally known process of diffusion bonding, which is a solid state brazing or welding process which joins together the parts at the interface thereof.

However, diffusion bonding requires precise mating surfaces without unacceptably large surface irregularities therebetween which would degrade diffusion bonding thereat. Correspondingly, machining of the mating surfaces requires precise tolerances which is difficult and expensive to achieve, especially over a 3-D interface matching the twist of the airfoil. Accordingly, the cost of a diffusion bonded airfoil may approach the cost of manufacturing two conventionally cast single blades, and is therefore prohibitively expensive.

Accordingly, an improved method of making hollow gas turbine engine vanes and blades is desired for further increasing the efficiency of operation of the engine.

BRIEF SUMMARY OF THE INVENTION

A method of making a hollow airfoil includes machining first and second parts to produce internal features thereof. The parts are then co-machined simultaneously at complementary joining surfaces. The parts are then bonded together at the co-machined joining surfaces.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
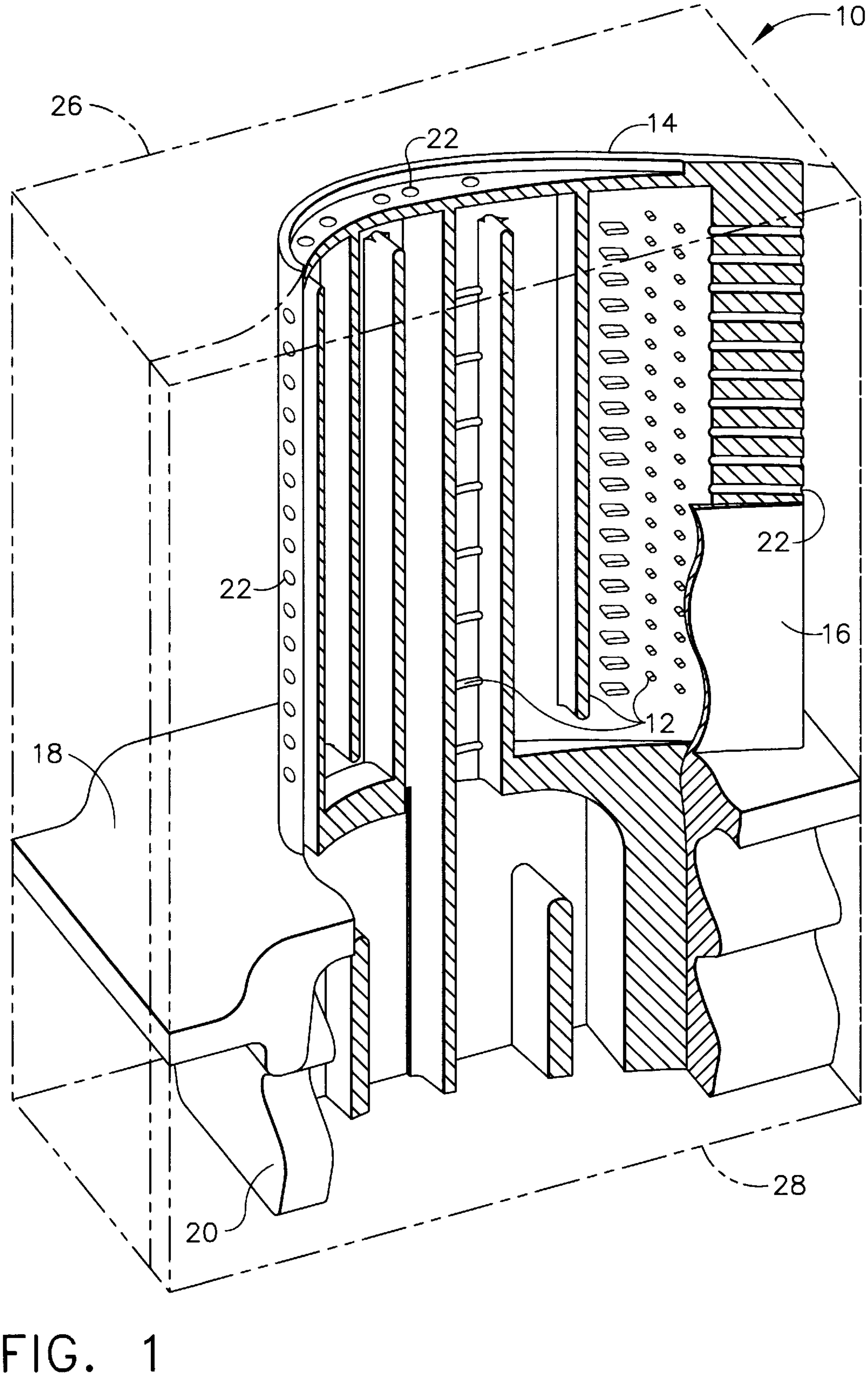
FIG. 1 is an isometric view of an exemplary gas turbine engine airfoil in the form of a turbine rotor blade shown in part cut-away to show internal cooling features therein.

Illustrated in FIG. 1 is an exemplary turbine airfoil 10 of a gas turbine engine which may be manufactured in accordance with the present invention. The airfoil is hollow for internal cooling thereof by cooling air, and is in the exemplary form of a high pressure turbine rotor blade, although it may also be configured as a stator vane, or other suitable airfoil or strut in the engine.

The airfoil includes internal cooling features 12 which may take any conventional form including multi-pass serpentine cooling passages extending from the bottom to the top of the airfoil, with a bottom inlet for receiving the cooling air; and turbulators in various forms such as ribs or pins.

The airfoil has an external configuration including features specifically configured for its use as either a turbine vane or blade. For example, the main body of the airfoil includes a generally convex suction side 14, and a generally concave pressure side 16 joined together at axially opposite leading and trailing edges which extend radially from the root to the tip thereof over which is channeled the hot combustion gases during operation. A platform 18 defines the inner flowpath or gas boundary of the airfoil, and a dovetail 20 is disposed radially therebelow for mounting the airfoil to a rotor disk of the engine. In a vane embodiment, the main body of the airfoil would be joined at the radially outer and inner ends thereof to arcuate outer and inner bands which define the respective flowpath boundaries, without the need for a mounting dovetail.

The airfoil may also include various cooling air holes 22 for discharging the cooling air from inside the airfoil into the combustion gas flowpath. The cooling holes 22 may be in the form of inclined film cooling holes through the suction and pressure sides 14,16; cooling holes through the airfoil tip; and cooling holes at the trailing edge of the airfoil.

The airfoil 10 itself may have any conventional configuration as either a turbine rotor blade or turbine stator vane with the external features being determined by the particular design application. The internal cooling features 12 may also vary as desired for maximizing the cooling effectiveness of the air channeled through the airfoil as introduced at the bottom of the dovetail 20 and discharged through the various cooling holes 22.

The efficiency of cooling the airfoil, and correspondingly the efficiency of the entire engine, may be improved by improving either the configuration or manufacturing accuracy of the various internal cooling features 12. Conventional casting technology is limited in the ability to accurately form the internal cooling features, and is limited in the configurations of those features. And, as indicated above, the use of impingement baffles inside an airfoil is limited by the ability to assemble such baffles through either the root or tip of the airfoil.

Figure 2:
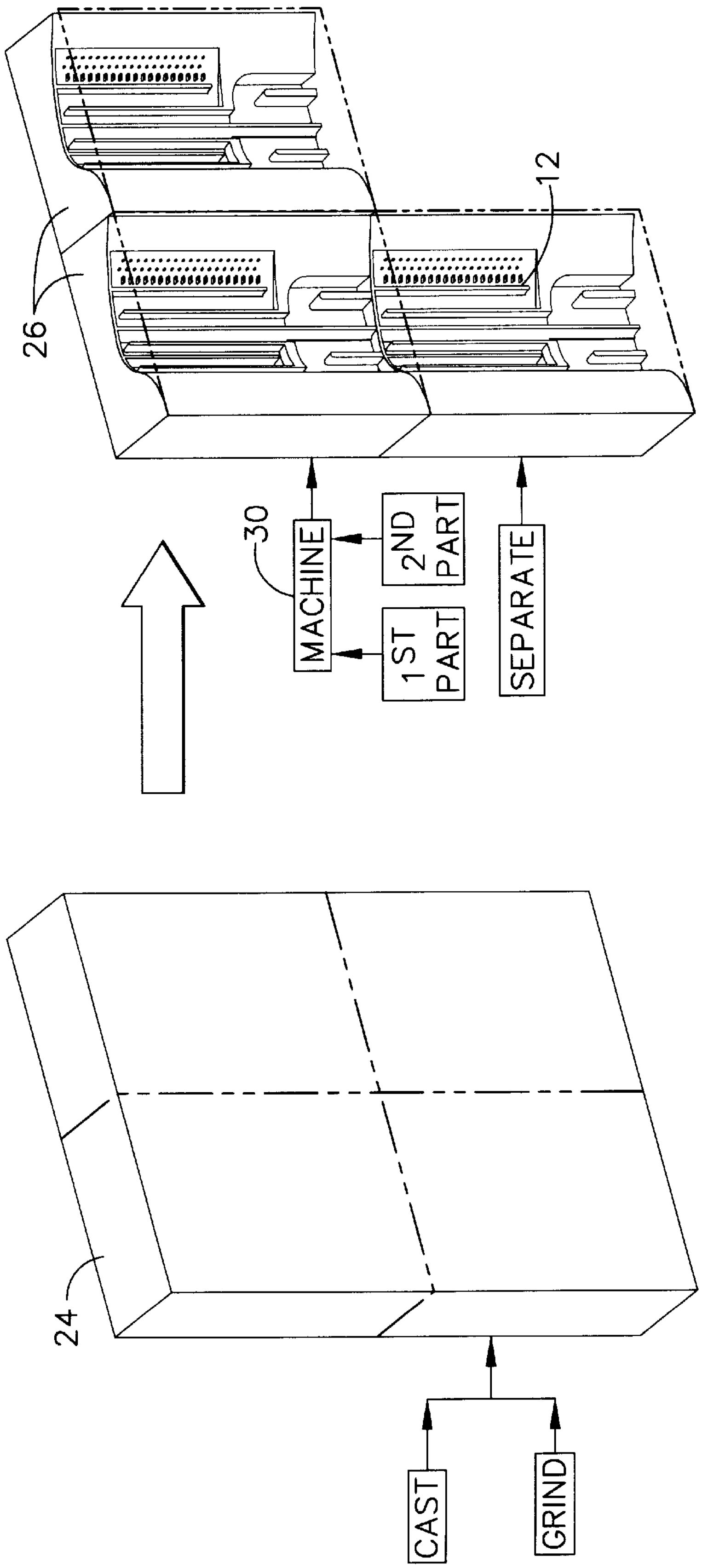
FIGS. 2–4 are a schematic representation of a method of making the airfoil illustrated in FIG. 1 in accordance with an exemplary embodiment of the present invention.
Figure 3:
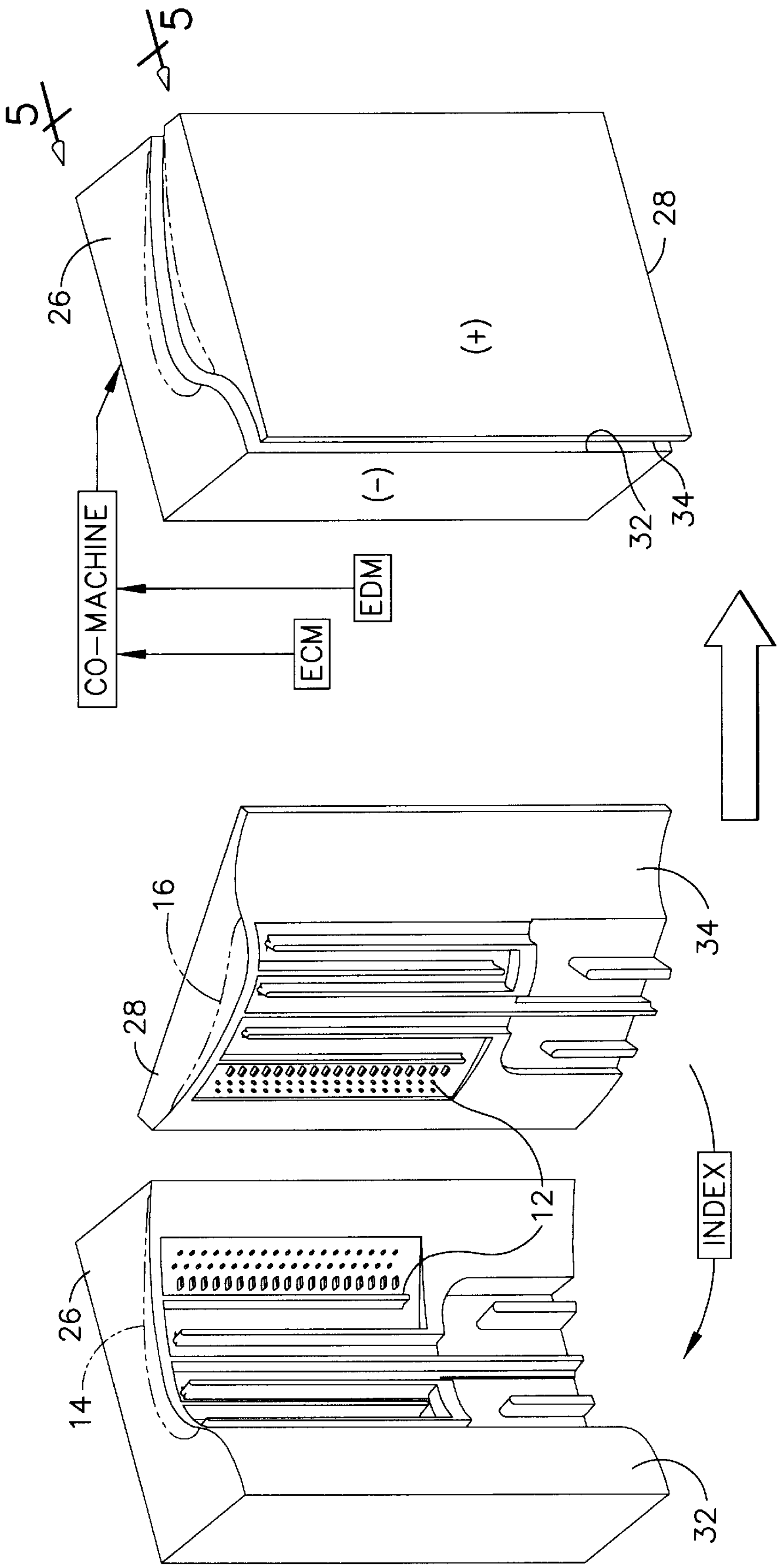
Figure 4:
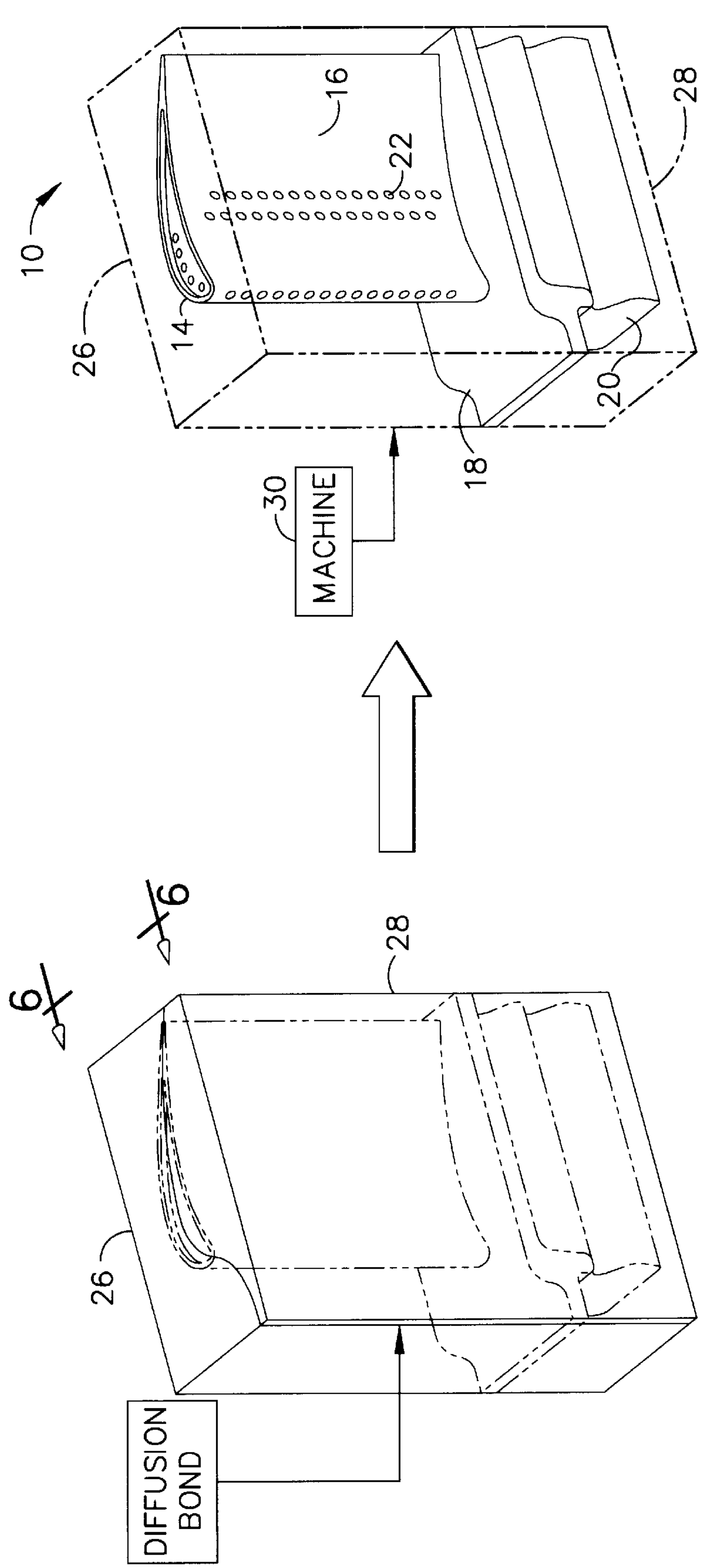

FIGS. 2–4 illustrate schematically an improved method of making or forming the hollow airfoil 10 of FIG. 1, in either rotor blade or stator vane form, in accordance with an exemplary embodiment of the present invention. The manufacturing process may be begun as shown in FIG. 2 by initially casting a blank slab 24 in any conventional manner, and suitably grinding the outer surface thereof to rough tolerances. In the preferred embodiment, the slab is in block form with generally flat and normal sidewalls for easy and accurate fixturing as required in subsequent manufacturing steps.

One or more of the slabs 24 is used for first machining a first part or half 26 to produce the corresponding internal cooling features 12 for the resulting airfoil 10 illustrated in FIG. 1, and for machining a second part or half 28 to produce the corresponding internal features 12 of the same airfoil. The internal features of the first and second parts 26,28 may be machined in any conventional manner using a multi-axis machine tool 30 for example.

In this way, the internal cooling features 12 of the resulting airfoil 10 are directly accessible at the beginning of the manufacturing process and may be precisely machined into the slab 24 with considerable detail and accuracy. Each part forms a corresponding half or radial portion of the airfoil, and the internal cooling features 12 may be split therebetween as desired to include the multi-pass serpentine cooling passages, turbulators, and internal partitions or flow channels for example.

In the preferred embodiments illustrated in FIG. 2, a single slab 24 is machined for sets of the internal cooling features 12 corresponding with a plurality of the first parts 26 in one slab, or a plurality of the second parts 28 in one slab, or both parts 26 and 28 in the same slab. The individual parts 26,28 may then be separated from the slab 24 and from each other by conventional cutting.

In the preferred embodiment illustrated in FIG. 3, the two parts 26,28 correspond generally with the respective suction and pressure sides 14,16 of the airfoil, and the internal cooling features 12 thereof are separated generally equally along the camber line between the leading and trailing edges of the airfoil.

The two parts 26,28 are then suitably indexed or provided with reference datums for accurately aligning together the corresponding internal cooling features 12 of both parts so that they may be assembled together with the internal features cooperating to define the resulting internal flow passages of the airfoil.

In accordance with another feature of the present invention, the two parts 26,28 are simultaneously co-machined at complementary first and second joining surfaces 32,34 to provide a near exact or perfect fit for subsequent bonding. During the machining process of the two parts, the corresponding internal cooling features 12 thereof are machined to final and precise tolerances, whereas the joining surfaces 32,34 may be machined to a relatively rough tolerance providing several mils, for example, of additional material which may be removed by co-machining for a precise mating fit-up of the two parts. Although the two parts are separately initially produced or machined, they are simultaneously co-machined together in pairs for accurately and relatively inexpensively preparing the joining surfaces for subsequent bonding.

Accordingly, once the joining surfaces 32,34 are accurately co-machined, the two parts may then be bonded together at the joining surfaces as illustrated in FIG. 4 to form an integral or unitary assembly of the two parts, with the corresponding internal cooling features 12 being suitably aligned with each other. The bonded together parts 26,28 may then be conventionally machined, using the multi-axis machine tool 30 for example, to produce the desired external features thereof such as the suction and pressure sides 14,16; platform 18; and dovetail 20. And, the various cooling holes 22 may also be formed or drilled into the airfoil 10 in any conventional manner once the external features are machined to final tolerances.

Of particular importance in the present invention is the initial rough machining of the first and second parts 26,28 at the joining surfaces 32,34 prior to co-machining thereof. The path of the joining surfaces 32,34 may be selected as desired for bifurcating the airfoil in two parts, with certain features associated with the suction side 14 being in one part and certain features associated with the pressure side 16 being in the other part, with the features being complementary and collectively defining the respective airfoil, subject to final external machining.

As shown in FIG. 3, the joining surfaces 32,34 include portions surrounding the internal cooling features 12 from the bottom of the dovetail to the tip of the airfoil main body, and between the leading and trailing edges thereof. The joining surfaces may also include respective portions of some of the internal cooling features 12 as desired, including, for example, various partitions bridging the suction and pressure sides to define the serpentine cooling passages. The joining surfaces also may include flow partitions along the trailing edge which channel the cooling air to the trailing edge holes of the airfoil.

These various features of the two joining surfaces are initially rough machined in height along the circumferential extent of the airfoil so that during co-machining material is removed therefrom to precisely fit together all of the complementary internal features of the parts for optimum bond formation thereat.

As initially shown in FIG. 3, the co-machining of the two parts may be effected using the conventionally known processes of electrochemical machining (ECM) or electrical discharge machining (EDM) suitably modified for co-machining. In conventional ECM an electrode tool is specifically configured with a cutting face being the mirror image of the resulting surface desired in the part. Similarly, in EDM a separate electrode tool may either have a mirror image for machining the respective part, or may be moved as desired for sculpting the required surface contour. In either case, a separate tool is required for machining the corresponding part.

In contrast, and in accordance with the present invention, each of the two parts 26,28 itself is the tool for machining the other part without using a separate cutting tool specifically configured therefor.

Figure 5:
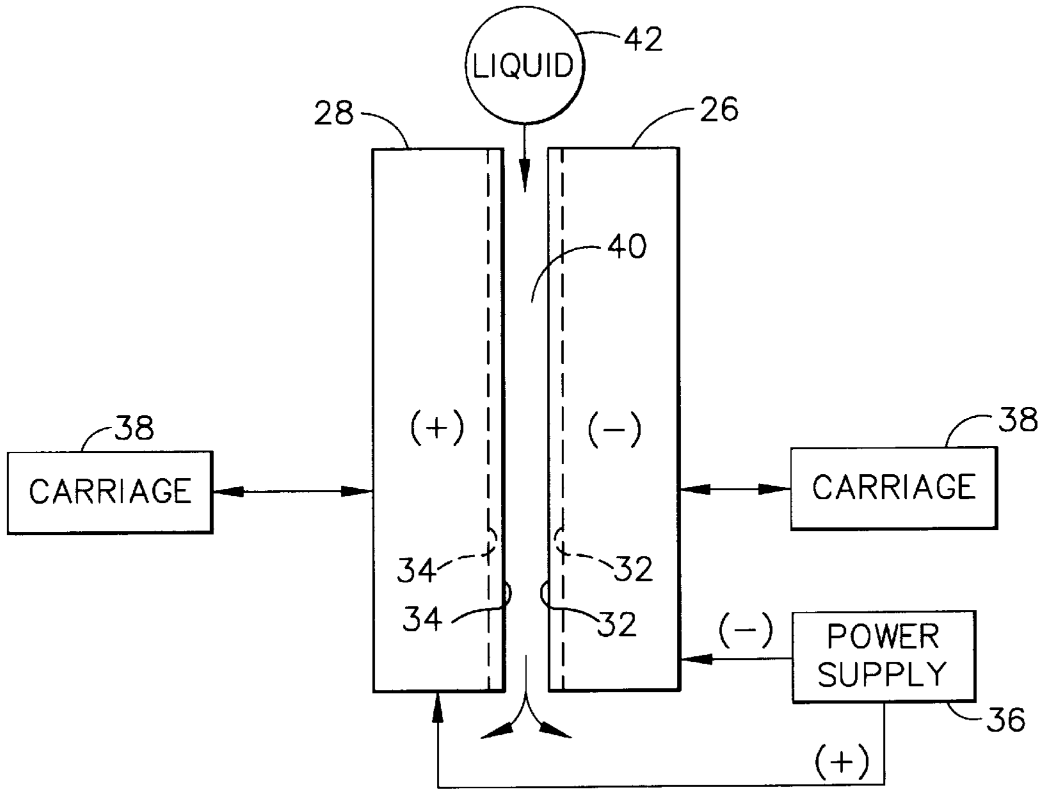
FIG. 5 is an elevational view of the co-machining step illustrated in FIG. 3 and taken generally along line 5—5.

FIG. 5 illustrates schematically exemplary embodiments of co-machining the two parts 26,28 in accordance with a preferred embodiment. The two parts 26,28 are electrically powered using a suitable high current power supply 36 to define an anode (+) and cathode (−), respectively. The two parts are suitably fixtured in corresponding carriages 38 for accurately positioning together the two parts to maintain a predetermined gap 40 between the respective joining surfaces 32,34. A suitable liquid 42 is then channeled through the gap 40 to simultaneously co-machine or remove material from the joining surfaces 32,34 for exact matching thereof.

In FIG. 5, the joining surfaces are initially shown in solid line with a suitable amount of excess material for being co-machined. As the first part 26 machines the second part 28 at the joining surface 34, the second part simultaneously machines the first part at its joining surface 32 until sufficient material is removed from both surfaces as shown in dashed line for achieving a precise fit-up with substantially exact mating surfaces. Since the joining surfaces 32,34 may be relatively complex in contour to follow the three-dimensional configuration of the airfoil 10, which may twist from root to tip and have varying camber, the co-machining ensures a precise mating interface irrespective of the 3-D complexity of the parts and joining surfaces.

For electrochemical co-machining of the parts 26,28, the liquid 42 is a suitable electrolyte, and ECM may be performed in a conventional ECM machine specifically configured for fixturing the two parts 26,28 instead of each of those parts with an otherwise conventional ECM cutting electrode.

Similarly, for electrical discharge co-machining of the two parts 26,28, the liquid 42 is a suitable dielectric, such deionized water, which flows through the gap 40 for cooling the parts and removing debris, and EDM may be effected in a conventional EDM machine specifically configured for fixturing the two parts instead of either one of the parts and a corresponding conventional EDM cutting electrode. Whereas ECM removes material from both joining surfaces 32,34 by electrochemical action, EDM removes material therefrom by controlled sparking or arcing, with both processes resulting in a smooth and substantially exact fit-up at the co-machined joining surfaces 32,34.

Whereas the rough machining of the joining surfaces 32,34 may have a relatively large tolerance on the order of a few mils to save machining time and cost, the co-machining of the joining surfaces can effect a precise match of the surfaces on the order of a few tenths of a mil at reduced machining time and cost for ensuring an optimum diffusion bond.

Figure 6:
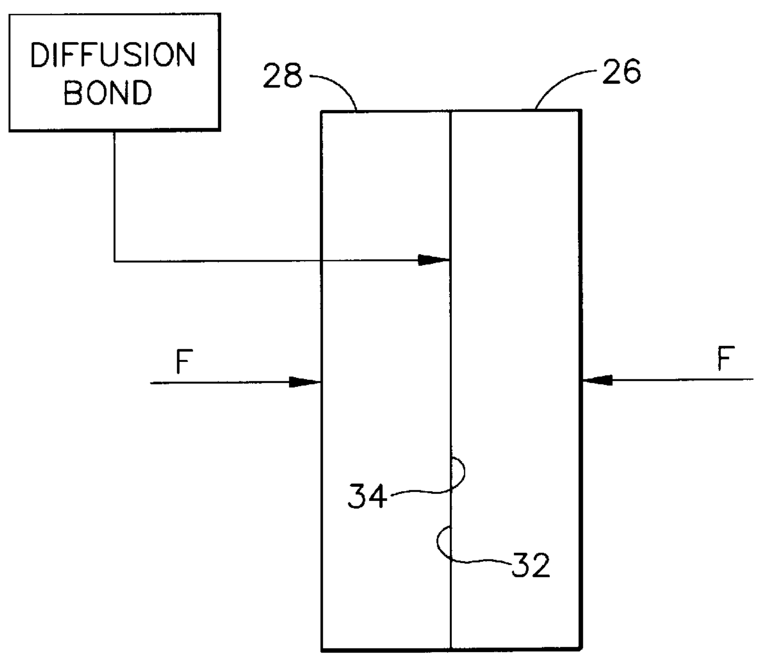
FIG. 6 is a elevational view of the bonding step illustrated in FIG. 4 and taken generally along line 6—6.

After the two parts are co-machined, they may then be suitably fixtured for undergoing suitable bonding thereof such as diffusion bonding illustrated in more particularity in FIG. 6. Diffusion bonding is a conventionally known solid state brazing or welding process conducted under moderate pressure and elevated temperature. The two parts 26,28 are suitably aligned together with the co-machined joining surfaces 32,34 being in contact with each other under a suitable external force F which maintains the interface in compression. Diffusion bonding is conducted at a suitable temperature to integrally bond the two parts together in a resulting unitary or one-piece assembly having corresponding material strength for withstanding the hostile environment of the gas turbine engine.

A particular advantage of the present invention is that the initial slab 24 illustrated in FIG. 2 is in block form, and the internal cooling features 12 are formed in a single side thereof. Accordingly, when the co-machined parts are assembled as illustrated in FIG. 6, the external surfaces are blank or devoid of typical airfoil features and provide flat surfaces which are easy to fixture and align not only for the diffusion bonding process, but also for the co-machining process and initial machining of the internal cooling features 12.

Since the EDM co-machining process may create a thin recast layer atop the co-machined surfaces 32,24, the diffusion bonding process may use a suitable interlayer including Boron which transitions through a liquid phase for dissolving the recast layer and improving the resulting diffusion bond.

As indicated above, after the two parts are diffusion bonded together as illustrated in FIG. 4, the various external features 14–20 may then be conventionally machined therein, and in one embodiment, define a gas turbine engine high pressure turbine rotor blade as illustrated in FIGS. 1 and 4. In alternate embodiments, the two parts may be configured for forming a turbine stator vane. And, in yet other embodiments, other components may be so formed for enjoying the various benefits of the present invention.

These benefits include the ability to precisely form internal features in a hollow article by initially forming the article in two parts for machining the internal features, and then bonding together the two parts in an otherwise integral, one-piece assembly. Diffusion bonding results in the two parts being metallurgically bonded together at the joining surfaces which are essentially supplanted by the bond to maintain the strength of the base materials. The improved process substantially reduces the cost of manufacturing this type of two-part article. The improved process also allows internal cooling features not before possible in conventionally cast blades.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A method of making a hollow turbine article comprising:

forming first and second slab blocks having flat and normal external sidewalls;

fixturing said blocks at said flat sidewalls;

machining said first block to produce a first part having internal features of said article;

machining said second block to produce a second part having internal features of said article;

fixturing said parts again at said flat sidewalls;

co-machining simultaneously said fixtured first and second parts at complementary joining surfaces;

fixturing said parts again at said flat sidewalls; and bonding together said fixtured first and second parts at said joining surfaces.

2. A method according to claim 1 further comprising machining said flat sidewalls of said bonded first and second parts to produce external features of said article.

3. A method according to claim 2 further comprising:

casting a slab;

grinding said slab to produce one of said slab blocks with said flat and normal sidewalls; and machining said arounded slab block to produce said internal features of one of said parts therein.

4. A method according to claim 3 further comprising machining in said slab said internal features corresponding with a plurality of said parts.

5. A method according to claim 4 further comprising separating said slab into a plurality of said slab blocks, and then co-machining said slab blocks to produce said parts in pairs.

6. A method according to claim 2 further comprising machining said first and second parts at said joining surfaces prior to co-machining thereof, and then co-machining said parts to match together said joining surfaces.

7. A method according to claim 2 further comprising:

electrically powering said first and second parts as anode and cathode, respectively;

positioning together said first and second parts to maintain a gap between said joining surfaces; and channeling a liquid through said gap to simultaneously remove material from said joining surfaces for matching thereof.

8. A method according to claim 7 wherein said liquid is an electrolyte, and said parts are electrochemically co-machined.

9. A method according to claim 7 wherein said liquid 42 is a dielectric, and said parts are co-machined by electrical discharge.

10. A method according to claim 2 wherein said first and second parts are diffusion bonded at said joining surfaces.

11. A method according to claim 2 wherein said article is a gas turbine engine high pressure turbine rotor blade.

12. A method of making an article comprising:

forming first and second slab blocks having flat and normal external sidewalls;

fixturing said blocks at said flat sidewalls;

machining said fixtured blocks to produce first and second complementary parts having corresponding internal features and opposite joining surfaces therein;

fixturing said parts a gain at said flat sidewalls;

co-machining together said fixtured first and second parts at said opposite joining surfaces to match each other thereat;

fixturing said parts again at said flat sidewalls; and bonding together said fixtured first and second parts at said matching surfaces.

13. A method according to claim 12 further comprising:

using said first part as a tool to co-machine said second part; and using said second part as a tool to co-machine said first part.

14. A method according to claim 13 further comprising electrically powering said first and second parts and channeling a liquid therebetween to electrically co-machine said parts at said joining surfaces.

15. A method according to claim 14 further comprising initially casting said first and second parts in a said slab, grinding said slab to produce said flat sidewalls, and then separately machining said internal features and joining surfaces in said slab.

16. A method according to claim 14 further comprising assembling said first and second parts at said matching surfaces in a collective block having said flat sidewalls, and then bonding together said parts.

17. A method according to claim 13 further comprising:

aligning together said internal features of said first and second parts; and co-machining together said parts additionally at said aligned internal features to match each other thereat.

18. A method according to claim 17 further comprising machining said flat sidewalls of said bonded first and second parts to produce external features of said article.

19. A method according to claim 18 further comprising:

machining said first and second parts to produce internal features including a flow channel and partition aligned together for said co-machining; and machining said flat sidewalls of first and second parts to produce external features including a convex suction side and concave pressure side collectively forming an airfoil having opposite leading and trailing edges.

20. A method according to claim 19 further comprising externally machining said first and second parts to additionally produce a platform at a root of said airfoil and a dovetail therebelow collectively defining a turbine rotor blade.

* * * * *